US008835739B2

(12) United States Patent
Bencar et al.

(10) Patent No.: US 8,835,739 B2
(45) Date of Patent: Sep. 16, 2014

(54) KEYSTROKE AND MIDI COMMAND SYSTEM FOR DJ PLAYER AND VIDEO GAME SYSTEMS

(75) Inventors: Gary Bencar, Holualoa, HI (US); Rick Aaron Bidlack, Tukwila, WA (US)

(73) Assignee: Beamz Interactive, Inc., Scottsdale, AZ (US)

( * ) Notice: Subject to any disclaimer, the term of this patent is extended or adjusted under 35 U.S.C. 154(b) by 69 days.

(21) Appl. No.: 13/494,093

(22) Filed: Jun. 12, 2012

(65) Prior Publication Data

US 2012/0266741 A1 Oct. 25, 2012

Related U.S. Application Data

(60) Provisional application No. 61/617,469, filed on Mar. 29, 2012, provisional application No. 61/593,828, filed on Feb. 1, 2012.

(51) Int. Cl.
G10H 1/18 (2006.01)

(52) U.S. Cl.
USPC .............................................. 84/615; 84/653

(58) Field of Classification Search
USPC ................................................... 84/615, 653
See application file for complete search history.

(56) References Cited

U.S. PATENT DOCUMENTS

| | | | |
|---|---|---|---|
| 6,351,225 B1 * | 2/2002 | Moreno .......................... | 341/22 |
| 6,685,480 B2 * | 2/2004 | Nishimoto et al. ............ | 434/247 |
| 6,960,715 B2 * | 11/2005 | Riopelle ........................ | 84/725 |
| 7,183,481 B2 * | 2/2007 | Hales ............................. | 84/645 |
| 7,215,328 B2 * | 5/2007 | Sim et al. ...................... | 345/168 |
| 7,255,502 B2 * | 8/2007 | McLoone et al. ............. | 400/486 |
| 7,441,193 B1 * | 10/2008 | Wild et al. ..................... | 715/733 |
| 8,354,580 B2 * | 1/2013 | Bowen ........................... | 84/719 |
| 2003/0110929 A1 * | 6/2003 | Riopelle ......................... | 84/615 |
| 2005/0223330 A1 * | 10/2005 | Riopelle ....................... | 715/716 |
| 2005/0241466 A1 * | 11/2005 | Riopelle ......................... | 84/725 |
| 2009/0221369 A1 * | 9/2009 | Riopelle ......................... | 463/35 |
| 2010/0107855 A1 * | 5/2010 | Riopelle et al. ................ | 84/600 |
| 2011/0143837 A1 * | 6/2011 | Riopelle ......................... | 463/35 |
| 2012/0041572 A1 * | 2/2012 | Halsall ............................ | 700/19 |
| 2012/0266741 A1 * | 10/2012 | Bencar et al. .................. | 84/645 |
| 2013/0106686 A1 * | 5/2013 | Bennett ......................... | 345/156 |
| 2013/0138233 A1 * | 5/2013 | Sandler et al. ................. | 700/94 |
| 2013/0207790 A1 * | 8/2013 | Corson et al. ............. | 340/12.54 |

FOREIGN PATENT DOCUMENTS

CA 2062934 A * 9/1993

OTHER PUBLICATIONS

International Search Report dated Sep. 25, 2013 in connection with International Patent Application No. PCT/US2013/023459, 6 pages.
Written Opinion of International Searching Authority dated Sep. 25, 2013 in connection with International Patent Application No. PCT/US2013/0234589, 10 pages.

(Continued)

*Primary Examiner* — David S. Warren
(74) *Attorney, Agent, or Firm* — Robert C. Klinger (57) ABSTRACT

A software application configured to enable a single controller trigger to send arbitrarily complex sequences of keystroke and/or MIDI control messages to a multi-media device. Examples of multi-media devices include DJ players, video game systems, music, entertainment, and lighting control applications. Each trigger of the controller can be uniquely programmed to generate a complex sequence of keystrokes and/or MIDI control messages, allowing more complex and higher performance control of the multi-media device.

15 Claims, 10 Drawing Sheets

SOFTWARE OPERATION FOLLOWING RECEPTION OF A STOP TRIGGER

(56) References Cited

OTHER PUBLICATIONS

"MIDI Solutions F8; General Purpose Input to MIDI"; http://www.midisolutions.com/prodf8.htm; Dec. 18, 2011; XP055060254; 3 pages.

Nicola L. Krause; "A Tool-Kit for Interactive Exhibitions for the Partially Sighted and Blind"; Sep. 2004; XP055060240; Bartlett School of Graduate Studies; University College London; 45 pages.

Quick Time; wikipedia.org; Jan. 22, 2012; XP055060250; http://en.wikipedia.org/wiki/Quick_Time; 22 pages.

* cited by examiner

FIG. 2

FIGURE 3 – SOFTWARE OPERATION FOLLOWING RECEPTION OF A START TRIGGER

FIGURE 4 – SOFTWARE OPERATION FOLLOWING RECEPTION OF A STOP TRIGGER

FIGURE 5 – DETAILS OF SENDING A KEYSTROKE SEQUENCE

FIGURE 6 – DETAILS OF SENDING A MIDI SEQUENCE

FIGURE 7— BEAMZ DJ MAIN GRAPHICAL UNSER INTERFACE

FIGURE 8— INSPECTOR WINDOW FOR KEYSTROKE EVENTS

FIGURE 9– INSPECTOR WINDOW AFTER ENTERING KEYSTROKE SEQUENCE AND DESCRIPTIVE LABEL

FIGURE 10– BEAMZ DJ MAIN GUI AFTER CLOSING INSPECTOR, SHOWING NEW LABEL ON LASER 3

FIGURE 11 – INSPECTOR AFTER ENTERING TWO MIDI SEQUENCES

US 8,835,739 B2

KEYSTROKE AND MIDI COMMAND SYSTEM FOR DJ PLAYER AND VIDEO GAME SYSTEMS

CLAIM OF PRIORITY

This application claims priority of U.S. Provisional Patent Application Ser. No. 61/593,828, filed Feb. 1, 2012, entitled "DJ Controller" and U.S. Provisional Patent Application Ser. No. 61/617,469, filed Mar. 29, 2012, entitled "DJ Controller", the teachings of which are incorporated herein by reference.

FIELD OF INVENTION

The present invention is generally directed to controllers for multi-media devices, and more particularly to devices for controlling disc jockey (DJ) applications and video game systems.

BACKGROUND

Most commercial DJ applications (e.g. Serato, Virtual DJ, Traktor) can be controlled by means of keystroke commands from the computer's alphanumeric keyboard, and/or by means of MIDI (Musical Instrument Digital Interface) commands from an external source or from a "virtual" MIDI source running as a software application within the same computer. Some third-party software is also tightly integrated with custom hardware and sold as a package. Game players also control video games by keystroke commands from the computer's alphanumeric keyboard.

In each case, a particular keystroke controls a dedicated function, and the user enters numerous keystrokes during a performance or play. With respect to DJ applications, MIDI control messages are created by activating respective switches such as tactile push-buttons, switches and knobs, where each switch controls a dedicated MIDI control message. As DJ applications and video game applications continue to increase in performance and complexity, the user is increasingly challenged to master the respective controllers and functions to create appealing and successful performances. With enough time and practice, users build their skills.

SUMMARY OF INVENTION

The present invention achieves technical advantages as mapping software configured to enable a single controller trigger to send arbitrarily complex sequences of keystroke and/or MIDI control messages to a multi-media device. Examples of multi-media devices include DJ players, video game systems, music, entertainment, and lighting control applications. Each trigger of the controller can be uniquely programmed to generate a complex sequence of keystrokes and/or MIDI control messages, allowing more complex and higher performance control of the multi-media device.

DETAILED DESCRIPTION OF THE PREFERRED EMBODIMENT

The mapping software of the present invention includes an application that addresses issues which arise out of at least two methods of control of multi-media devices, namely, keystrokes and MIDI commands. One embodiment of the invention is as an application allowing disc jockeys (DJs) and other entertainers to use controller triggers, such as laser beams and tactile push-buttons, such that each trigger can send arbitrarily complex sequences of keystroke and MIDI control messages to third-party DJ system, music, entertainment and lighting control applications. Each trigger may be programmed and assigned a complex sequence of keystrokes and/or MIDI controls. The invention, when implemented to control a DJ player, adds entertainment value to a live performance because it enables the translation of creative and dramatic hand and body gestures through 3D space, which are clearly visible to an audience, into audible changes in music and changes in lighting. In another embodiment of the invention, the application allows garners to control video game play by assigning a trigger, such as laser beams and tactile push buttons, to each send arbitrarily complex sequences of keystroke messages to a game system, allowing the user to better control the game, increase visual effects, and increase game performance, such as better moves or more complex functions.

Figure 1A:
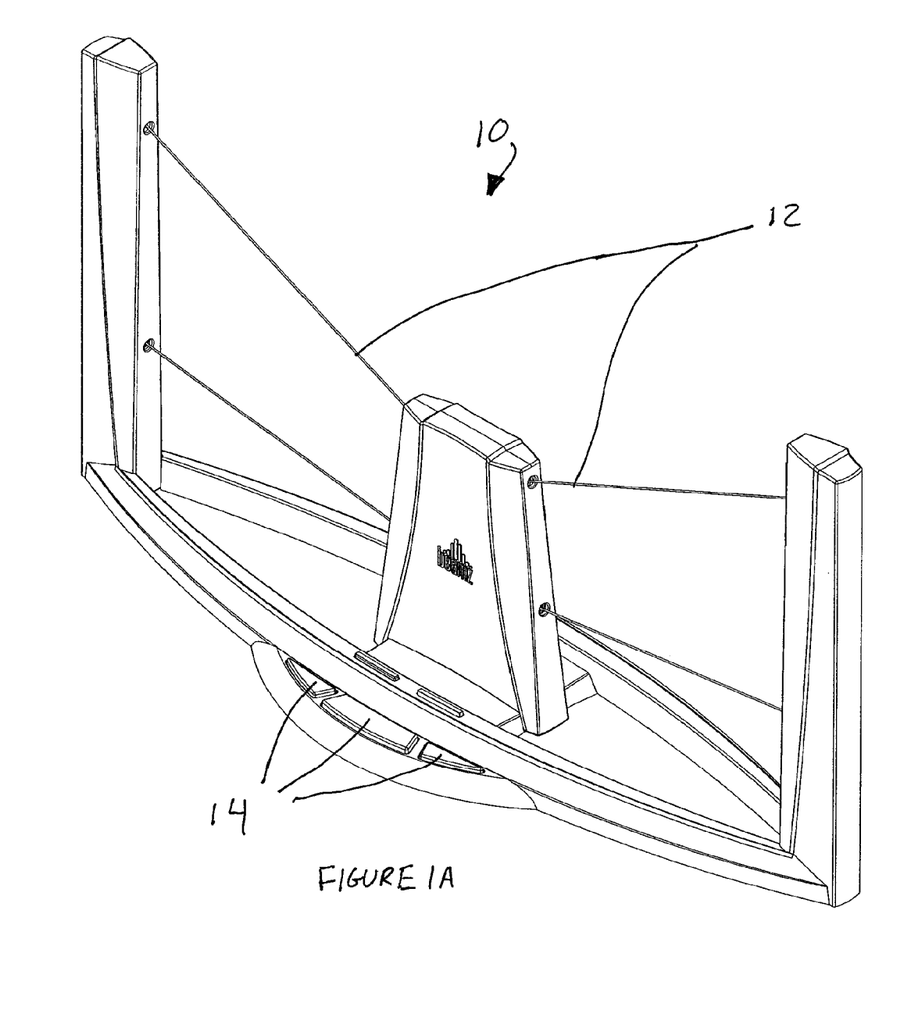
FIGS. 1A and 1B depict examples of hardware components shown as a controller including a plurality of triggers, including light beams/lasers and switches.
Figure 1B:
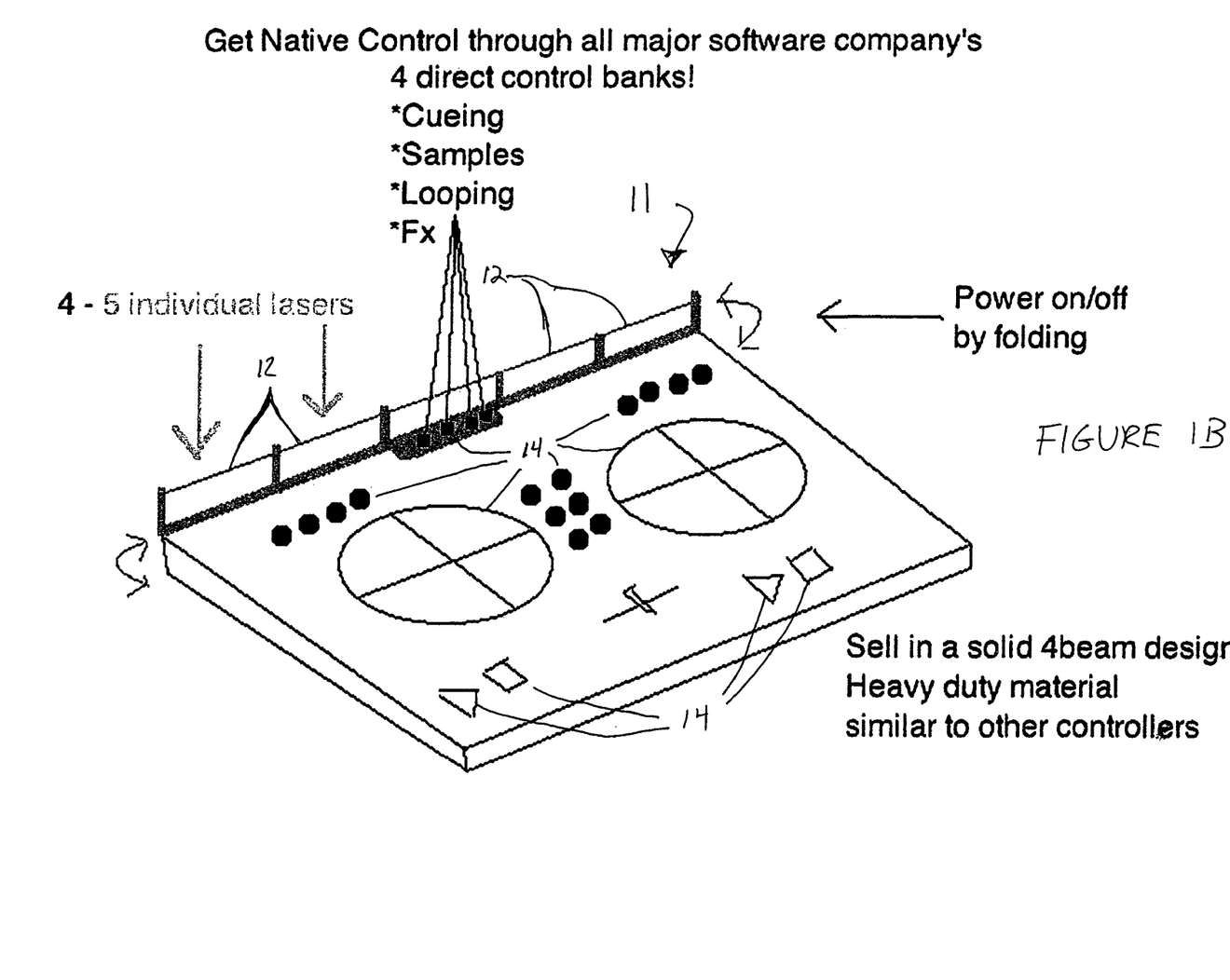

The invention consists of a software component referred to as an application throughout this description, and may consist of a hardware component in some embodiments. The hardware component, typically a controller, may comprise a USB device shown at 10 in FIG. 1A that provides a physical support matrix for a number of triggers, such as light beam or laser triggers 12, and buttons and switches 14. This hardware controller device 10 may be the Beamz Controller manufactured by Beamz Interactive, Inc. of Scottsdale, Ariz. The hardware controller may also be a DJ controller shown at 11 in FIG. 1B and comprising a plurality of triggers comprising light beams 12 and buttons/switches 14 comprising the triggers. Some of the triggers are in the form of low-power light beams or lasers 12 which are directed at light-receptive sensors and which can be interrupted by a user's hand, while others are switches 14 in the form of conventional push buttons. For the DJ player shown in FIG. 1B, the light beams are arranged collinear and adjacent to one another such that a DJ player can effectively and dramatically trigger the light beams during a performance and enhance the presentation. For purposes of this invention, the trigger can be any form of control device configured to responsively send a signal when triggered, such as a proximity sensor. A beam which is flooding its corresponding sensor with light is said to be "unblocked". A "blocked" beam, when blocked by a hand or other object, leaves the sensor in the dark. The beams are typically blocked and unblocked with the user's hand or fingers, although any material or object opaque to light could be used. The hardware and/or software of the controller detects the difference between a flooded sensor and a dark sensor, or a pressed or un-pressed button, as a change in state.

Figure 2:
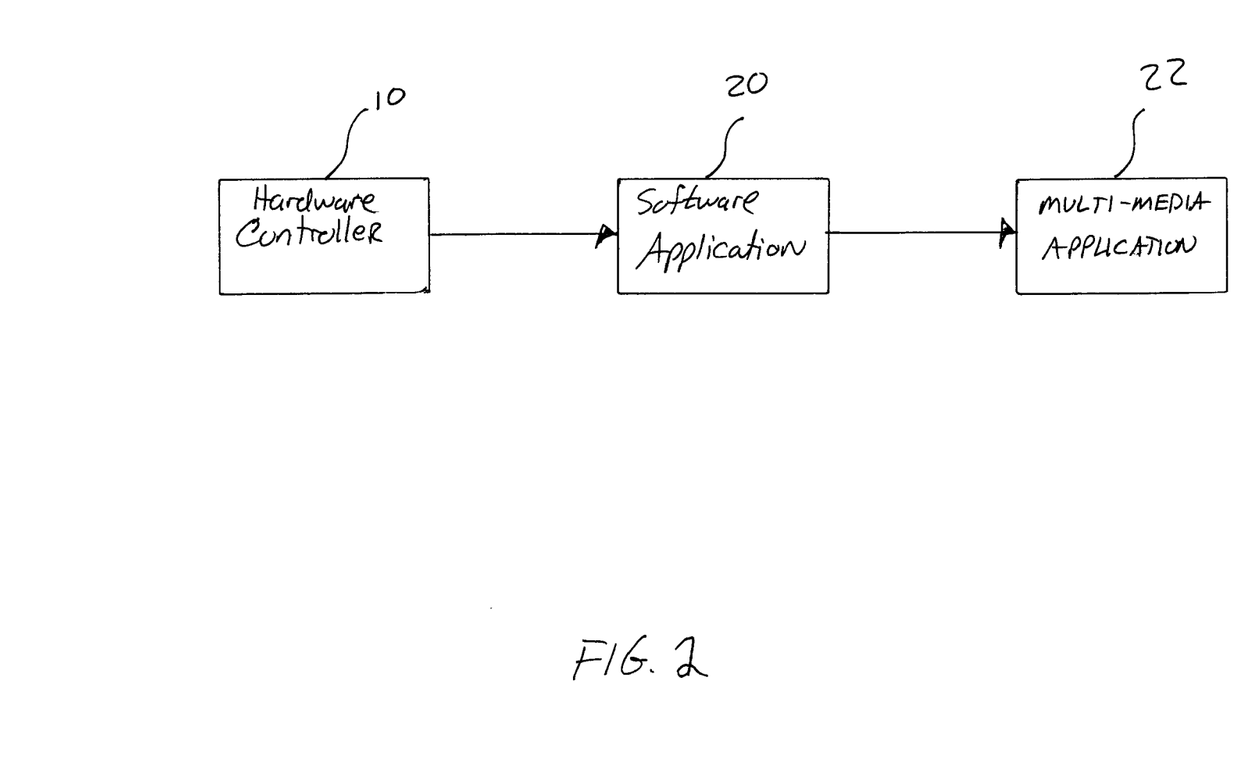
FIG. 2 depicts an overview of the hardware component and software application component configured to control a multi-media device.

As shown in FIG. 2, the software component itself shown at 20 is configured to control a multi-media device 22, such as a DJ player application or video game system, and contains a low-level component which runs in a separate thread, and which regularly polls the hardware component to request its current state with regard to which triggers are triggered, such as buttons that are pressed, those which are released, which sensors are flooded, and which are dark. The software component compares the current trigger state to the prior state (from the previous poll) and looks for changes. A change in button state from un-pressed to pressed, or a change in sensor state from flooded to dark, is interpreted as a START trigger. The opposite change, from pressed to released, or dark to flooded, is interpreted as a STOP trigger. In one embodiment, the software component when executed on a computer is designed to accommodate up to three hardware units attached, and/or operatively connected such as by way of a communications network, to one computer, although additional hardware units may be attached or operatively connected to one or more computers and limitation to this number is not to be inferred. Moreover, more than one computer executing the software, or modifications thereof, may be operatively interconnected to allow a large number of triggers from various devices to generate arbitrarily complex sequences of keystroke and MIDI control messages, such as during a large arena style concert. Thus, the software is scalable, such that users including DJ artists can create amazing, original audio and visual performances.

We turn now to the architecture and operation of the high-level software component of the invention.

Each trigger control (i.e. push-button or laser beam) on the controller of the hardware component is represented in software by a data structure which is referred to as the Control Trigger Information structure, or CTI. Each CTI contains the following members (member variables which are editable by the user are marked with a double asterisk **):

Keystroke Event Data
**A keystroke sequence table (a list of keystroke sequences), containing zero or more keystroke sequences. A keystroke sequence is defined as a series of one or more keystroke events.
**A flag indicating the trigger type for keystroke events (ONE-SHOT, REPEAT or HOLD-REPEAT).
**The keystroke repeat rate (ignored for ONE-SHOT).
**The keystroke repeat delay (ignored for ONE_SHOT).
A timer set to the keystroke repeat rate.
A timer set to the keystroke delay rate.
The keystroke table index.
The current hold-repeat key (used for HOLD-REPEAT).
  MIDI Event Data
**A MIDI sequence table (a list of MIDI sequences), containing zero or more MIDI sequences. A MIDI sequence is defined as a series of one or more MIDI events.
**A flag indicating the trigger type for MIDI events (ONE-SHOT or REPEAT).
**The MIDI event repeat rate (ignored for ONE-SHOT).
**The MIDI event repeat delay (ignored for ONE_SHOT).
A timer set to the MIDI event repeat rate.
A timer set to the MIDI event delay rate.
A queue of MIDI note-off events waiting to be transmitted.
The MIDI table index.
  Global Data
A flag indicating whether the trigger has been stopped by the user.
**A short descriptive label (non-functional, for usability only)

Example 1

A Trivial Case

To understand and appreciate the algorithm of the software application, examples of various complexity will be described. Hardware controllers 10 and 11 in FIGS. 1A and 1B may be used to generate the triggers described hereafter.

To begin with the most trivial case, let us assume that the user has not assigned any MIDI or keystroke sequences to any of the hardware trigger controls. All of the trigger controls' CTIs are in their default, empty state.

Figure 3:
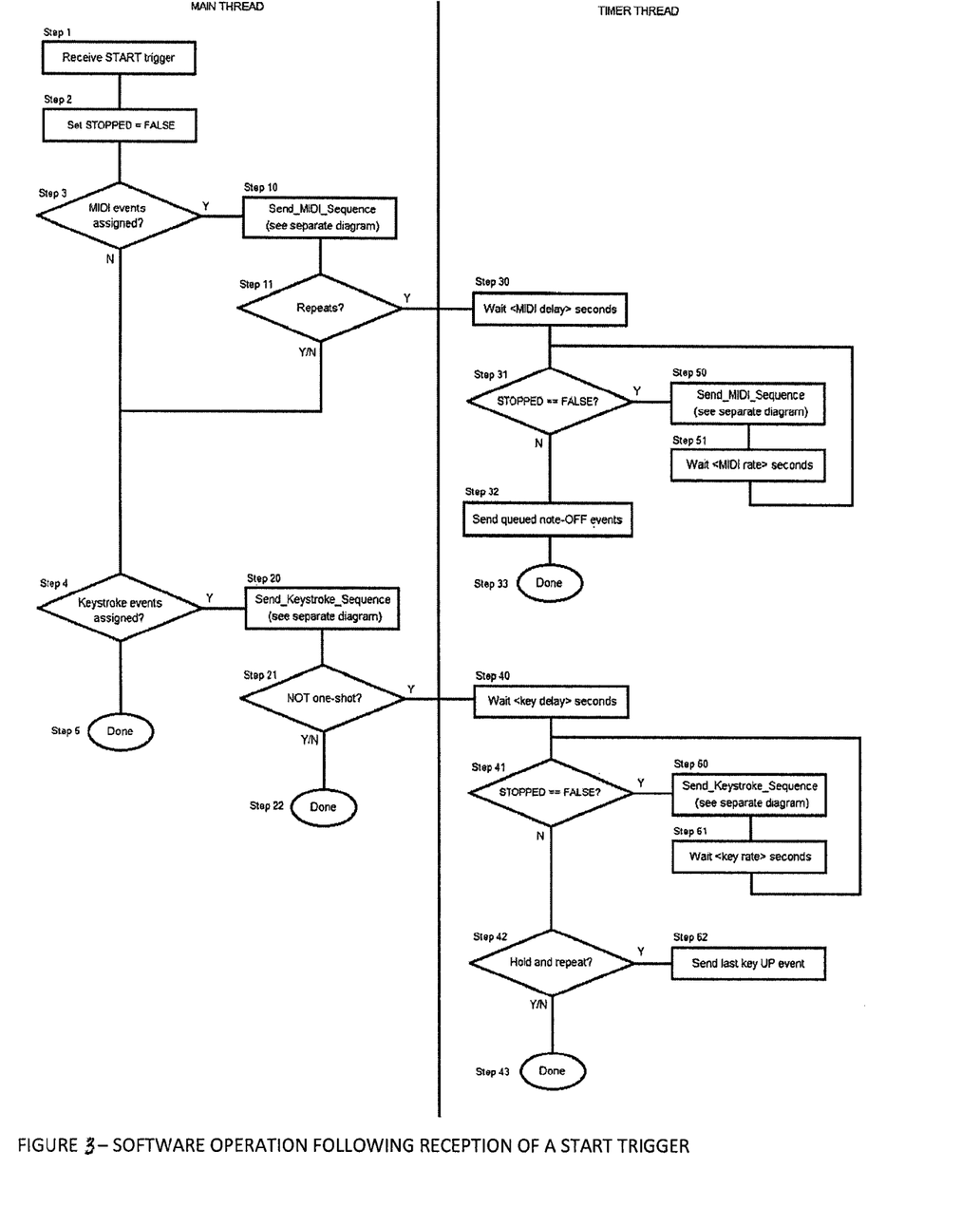
FIG. 3 depicts a flow diagram of an algorithm of the software component, including programming each controller trigger to send arbitrarily complex sequences of keystroke and/or MIDI control messages to a multi-media device.

The user activates a trigger such as by pushing a button or blocking a beam. As described above, the software application algorithm interprets a control state change from OFF to ON as a START trigger, and so notifies the main thread via a function call that a START trigger for the control has been received (FIG. 3, Step 1). The software application looks up the CTI for the control, and sets the global STOPPED flag for the CTI to FALSE (Step 2). It checks the size of the MIDI sequence table and finds that it is empty, which means that there are no MIDI-related tasks to carry out (Step 3). The software application therefore proceeds to check the size of the keystroke sequence table, and finds it empty as well, which means that there are no keystroke-related tasks to carry out either (Step 4). At this point the handling of the START trigger is complete (Step 5).

Figure 4:
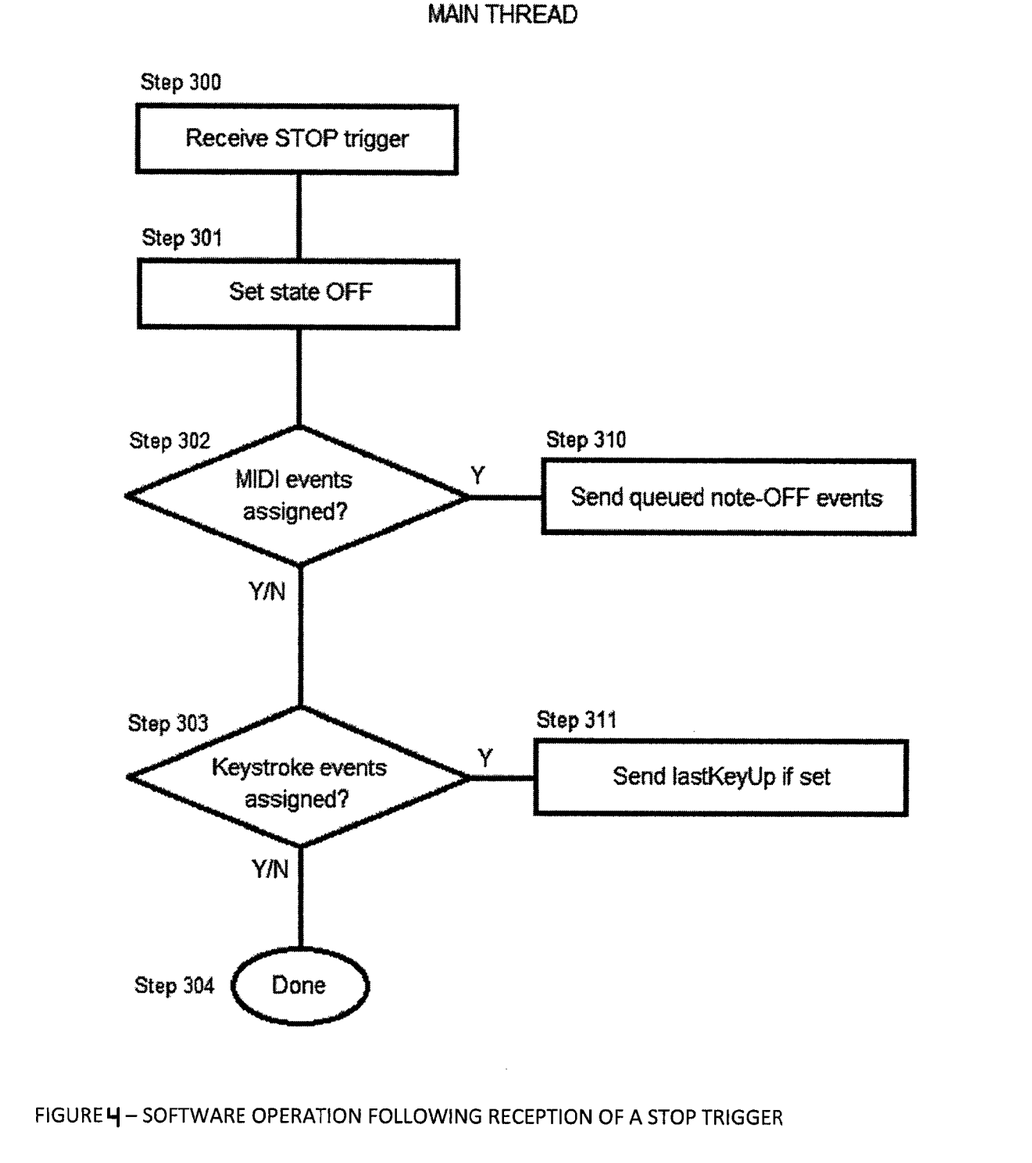
FIG. 4 depicts a flow diagram of an algorithm for processing a STOP trigger.

After some time, the user releases the button which has been pressed, or unblocks the beam which has been blocked, which causes a control state change from ON to OFF, which is received by the software application as a STOP trigger (FIG. 4, Step 300). The software application looks up the CTI for the control and sets the STOPPED flag to TRUE (Step 301). It checks the size of the MIDI sequence table and finds that it is empty; thus there are no MIDI-related tasks to carry out (Step 302). The software application therefore proceeds to check the size of the keystroke sequence table, and finds it empty as well, meaning there are no keystroke-related tasks to carry out either (Step 303). At this point the handling of the STOP trigger is complete (Step 304). Since neither MIDI commands nor keystroke events were assigned to a trigger of the hardware controller, at the conclusion of the START/STOP trigger cycle, no events have been sent to any other application running on the computer.

Example 2

A Simple One-Shot Keystroke Sequence

Figure 7:
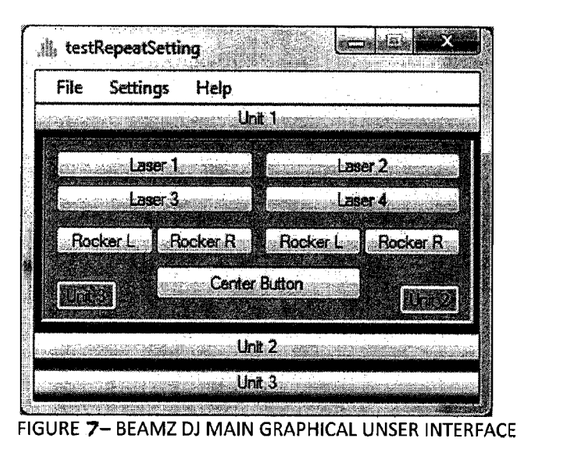
FIG. 7 depicts a main graphical user interface (GUI)
Figure 8:
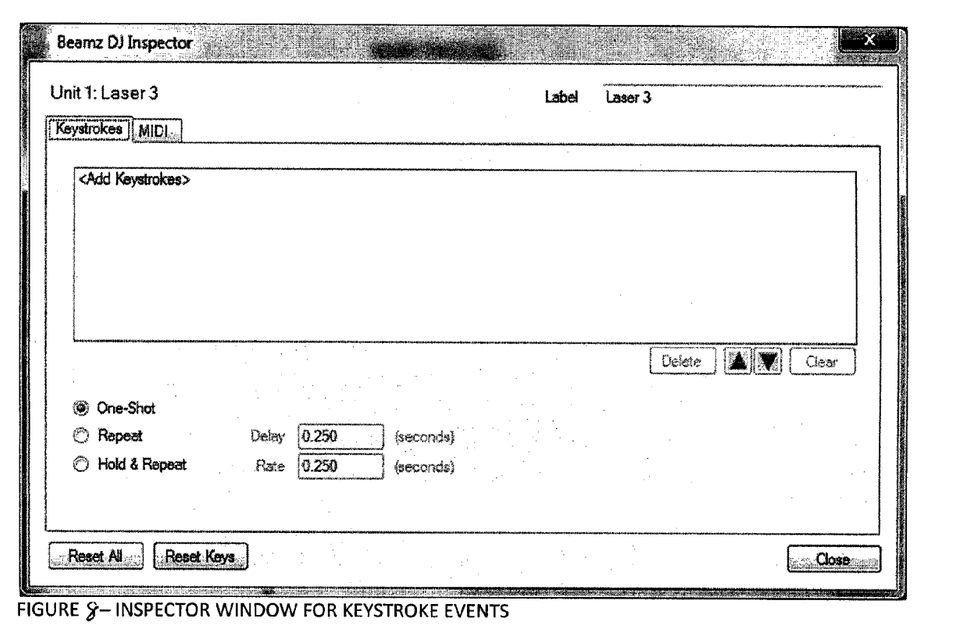
FIG. 8 depicts an Inspector Window for Keystroke Events.

The user creates the desired settings in the CTI by means of the graphical user interface (GUI) operable and displayed on the computer. The user selects a trigger control (push-button or laser beam) on the main GUI (FIG. 7), thereby opening the CTI Inspector (Editor) in a separate window. The Inspector provides access to members of the CTI using customary GUI objects such as text entry fields and buttons (FIG. 8).

Figure 9:
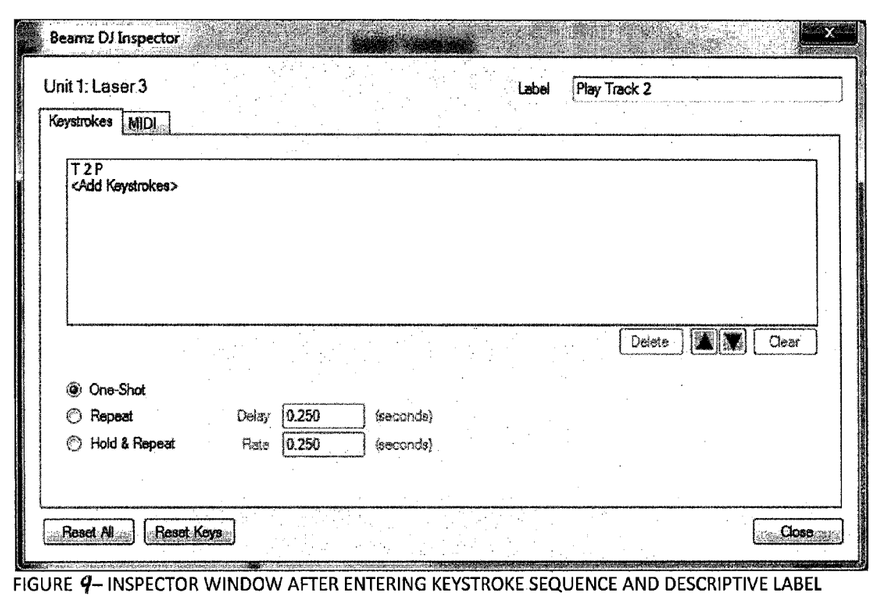
FIG. 9 depicts the Inspector Window loaded with a first keystroke sequence associated with a trigger labeled Laser 3.
Figure 10:
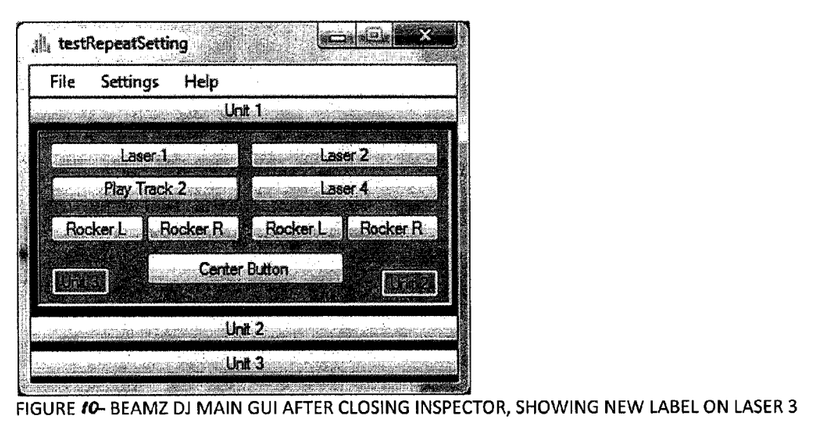
FIG. 10 depicts the main GUI where Laser 3 has been assigned a keystroke sequence effecting Play Track 2.

Let us suppose that the keystroke sequence "t2p", when typed into a third-party DJ player application, also referred to as the target application, will perform the command "Play Track 2", in whatever manner this command is defined by the third-party DJ player application. Let us further suppose that the user wishes to Play Track 2 whenever the third laser trigger on the first hardware controller unit is blocked. The user opens the Inspector for Laser 3, Unit 1, and types "t2p" into the text field provided. The user may optionally add a helpful label describing the effect of the programmed trigger (FIG. 9). The descriptive label is cosmetic only and has no control function. When the user closes the Inspector window, the information entered by the user is written to the CTI corresponding to trigger Laser 3 on Unit 1, and the main GUI is updated (FIG. 10). Thus, for this example, we have defined a simple one-shot keystroke trigger consisting of a single sequence which contains three keystrokes: "t2p".

The user now blocks trigger Laser 3 on Unit 1. The software application sends a START trigger as described above (FIG. 3, Step 1). The software application looks up the CTI for the control, and sets the global STOPPED flag for the CTI to FALSE (Step 2). The algorithm then checks the size of the MIDI sequence table and finds that it is empty, which means that there are no tasks to carry out in the MIDI domain (Step 3). The software application algorithm therefore proceeds to check the size of the keystroke sequence table, and finds that the table contains one sequence (Step 4). The software application then responsively proceeds to send this sequence (Step 20).

Figure 5:
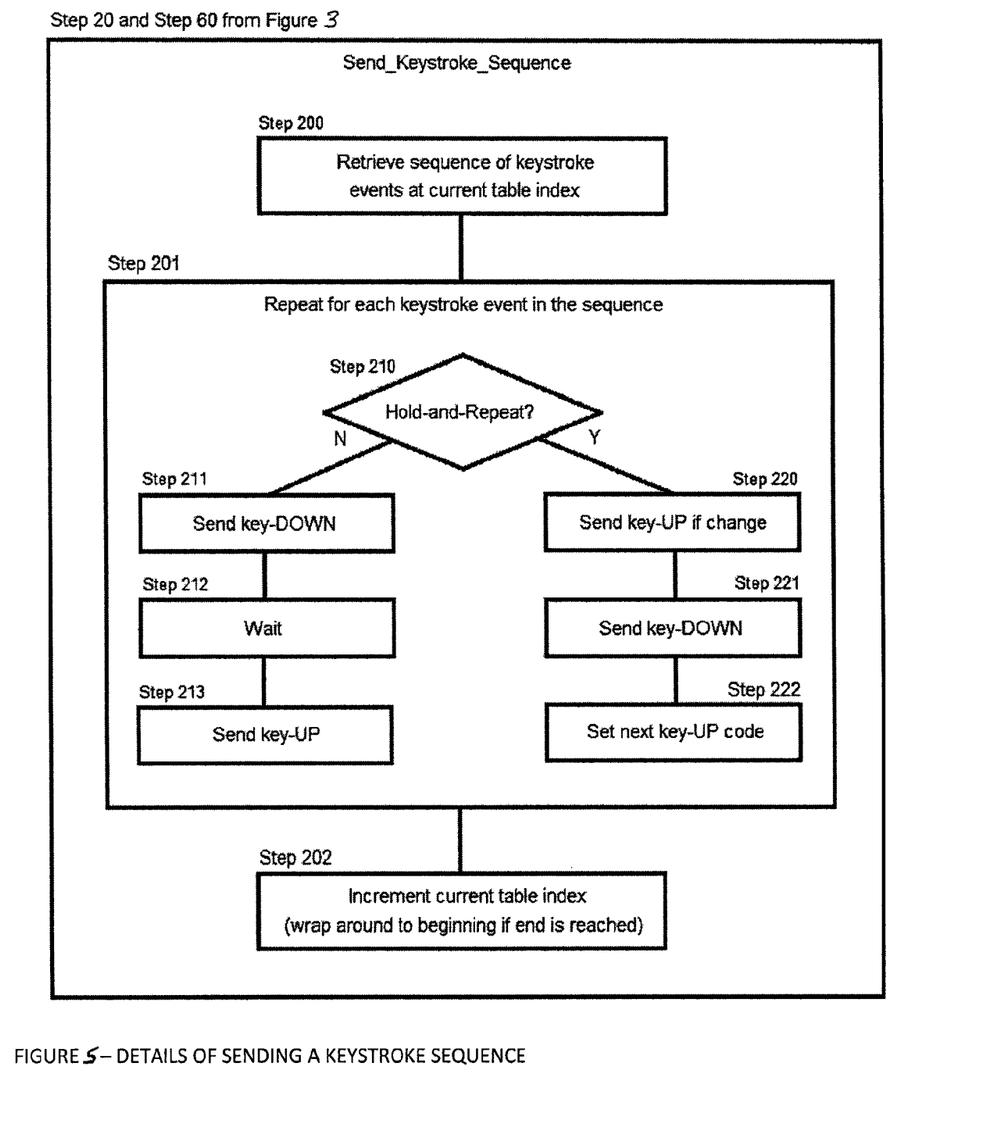
FIG. 5 depicts a flow diagram of an algorithm for processing a Send Keystroke Sequence.

The algorithm steps involved in sending the keystroke sequence "t2p" to the DJ player application are shown in detail in FIG. 5. First, the software application retrieves the keystroke sequence at the current table index position in the keystroke sequence table (Step 200). At the beginning, the table index position has the value "1", the first sequence in the table, which is keystroke sequence "t2p". The software application now enters a loop which is repeated for each event in this keystroke sequence (Step 201). The keystroke trigger type is checked and determined to be ONE-SHOT (Step 210). Since this is not HOLD-REPEAT, the algorithm proceeds to the next step, which is to synthesize and send a KEY-DOWN event for the first keystroke in our sequence, which is "t" (Step 211), to the DJ player application. The software application then waits a predetermined time period, such as for approximately 10 milliseconds, (Step 212), before synthesizing and sending a matching KEY-UP event for the keystroke (Step 213) to the DJ player application. The reason for the delay between the KEY-DOWN event and the matching KEY-UP event is to ensure that the two events are not received simultaneously by the target application, the third party DJ player, which can result in one or the other event being ignored or misinterpreted.

After the KEY-UP event for the first "t" is sent, the software application treats the remaining keystrokes in the sequence in the same manner. Thus, the software application sends KEY-DOWN/KEY-UP events for the "2" to the DJ player, followed by KEY-DOWN/KEY-UP events for the "p" to the DJ player. The keystroke "p" marks the end of the sequence, so the algorithm falls out of the loop and proceeds to the next step, which is to increment the keystroke table index to the value "2" (Step 202). Since there is only one sequence in the keystroke table, an index value of "2" is out of bounds, and so the index is then immediately set back to "1", or the beginning of the keystroke table. Thus, the table index position for a table containing only one sequence effectively never changes from "1".

Referring now back to FIG. 3, where we have just completed Step 20. The software application checks the keystroke trigger type to determine if it is ONE-SHOT (Step 21). In this case it is, and so there is nothing left to be done in the handling of the START trigger (Step 22).

After some time, the user unblocks the laser, which causes a control state change from ON to OFF, which is in turn received by the software application as a STOP trigger (FIG. 4, Step 300). The software application looks up the CTI for the control and sets the STOPPED flag to TRUE (Step 301). It checks the size of the MIDI sequence table and finds that it is empty; thus there are no MIDI-related tasks to carry out (Step 302). The software application then checks the size of the keystroke sequence table and finds a sequence (Step 303). It checks the value of the current Hold-Repeat key and discovers it is set to NONE (Step 311). There is therefore nothing left to do, and this cycle of the START/STOP trigger is now complete (Step 304).

The effect of the trigger Laser 3, Unit 1 being triggered is to send the keystroke sequence "t2p" just once to the DJ player application.

Example 3

Multiple One-Shot Keystroke Sequences

Let us now suppose that the keystroke sequence "t2sr", when typed into DJ player application comprising the target application, will perform the command "Stop Track 2 then Rewind Track 2 to the Beginning". Furthermore, let us suppose that the user wishes to send this keystroke sequence to the DJ player application using the same control beam we used in Example 2 (Laser 3 on Unit 1), and in such a manner that the first time the laser is blocked, it Plays Track 2; the next time the laser is blocked it Stops and Rewinds Track 2; the third time the laser is blocked it once again Plays Track 2; and so on, alternately Playing and Stopping Track 2 each time the laser is blocked.

The series of actions which are performed by the software application in this example are exactly the same as those performed in Example 2 in every regard, until we arrive at Step 202 in FIG. 5. This time, the keystroke table index position is incremented to the value "2", and it remains there, since there are two keystroke sequences in the table: "t2p" and "t2sr". Thereafter, the remaining steps through the end of the START/STOP trigger cycle remain the same as for Example 2.

The significance of the table index position is made clear when the user next blocks the beam. Again, the series of actions performed by the software application remain the same in every regard, until Step 201 in FIG. 5. This time, the value of the table index position is "2", and so the software application proceeds through Step 202 using the keystroke sequence "t2sr" rather than "t2p". After this keystroke sequence is sent, the software application falls out of the loop and on to Step 202, where the table index position is incremented to the value "3". This value is now out of bounds (since the table contains only two sequences), and so the index position is immediately reset to "1".

Thus, each time the user blocks and unblocks Laser 3 on Unit 1, the Beamz DJ player shown in FIG. 1, the software application alternates between sending two different keystroke messages to the target third-party application, the DJ player application.

Example 4

A Repeated Keystroke Trigger

Let us now suppose that the keystroke sequence "m1", when typed into the third-party DJ player application, plays an audio sample stored in memory position 1. Furthermore, let us suppose that the user wishes to send this keystroke message to the third-party DJ application on a regular and recurring basis.

In the Inspector, the user enters "m1" into the keystroke table, selects the REPEAT trigger type, and sets the repeat rate to the value desired. The user may set the initial delay to the same or a different value according to preference.

Once again, the series of actions performed by the software application remain exactly the same as described in Example 2, including all of the inner details of Step 20 as described above and depicted in FIG. 3, with the result that the keystroke sequence "m1" is sent to the DJ player application, causing it in turn to play the audio sample in memory position 1. At this point the software application checks the trigger type and sees that it is not a ONE-SHOT trigger, but is instead set to REPEAT (FIG. 3, Step 21). Now the software application starts a timer, running in a separate thread of execution, which is scheduled to lapse after a time interval determined by the keystroke repeat delay value (Step 40). When the timer lapses, the software application checks the global STOPPED flag for the CTI and discovers that it is still FALSE, because the user is still blocking the laser beam (Step 41). The software application then sends the keystroke sequence again (Step 60), in a manner precisely the same as described for Step 20. After the sequence is sent, the software application starts a new timer which is scheduled to lapse after a time interval determined by the keystroke repeat rate value (Step 61). After the timer lapses, the software application again checks the global STOPPED flag for the CTI to determine whether it should continue to repeat (Step 41).

The timer thread is now effectively in a loop. As long as the user keeps the beam blocked, the software application will continue to repeat steps 60, 61, and 41, at a rate determined by the trigger repeat rate.

Eventually the user unblocks the laser beam (FIG. 4, Step 300), and the STOPPED flag is set to TRUE (Step 301). In the timer thread in FIG. 3, which is still running, the action eventually loops back to Step 41, where the software application discovers that the STOPPED flag is now TRUE, and thus falls out of the loop (Step 42), at which point the trigger type is once again checked. The trigger type in this example is REPEAT (not HOLD-REPEAT), so there is nothing further to be done (Step 43). The trigger START/STOP cycle is now complete, and no further events will be sent to the DJ player application until the next START trigger is received by the software application.

Example 5

A Hold-Repeat Sequence

Computers handle events coming from the keyboard in this manner: when a key is depressed, the computer generates a KEY-DOWN message; and when the key is released, the computer generates a KEY-UP message. However, if the key is depressed for a certain length of time, then the computer begins to generate a series of KEY-DOWN messages at a rate determined by the operating system. A KEY-UP message is generated only when the key is released. Many third-party DJ players, video game systems, music and entertainment applications use this behavior as a signal from the user to perform some action when a particular key is depressed, and to continue to perform that action until the key is released.

The software application emulates this behavior with the HOLD-REPEAT trigger type. The HOLD-REPEAT trigger type is most often used with a single sequence containing a single keystroke.

Let us suppose that the keystroke "d", when typed into a third-party application and held down, performs a "detune" action until the "d" key is released. In the Inspector, the user enters "d" into the keystroke table, selects the HOLD-REPEAT trigger type, and sets the repeat delay and rate to the values desired.

The actions performed in response to the reception of a START trigger are exactly the same as in the prior examples until we arrive at Step 201 in FIG. 3. Now, the trigger type is discovered to be HOLD-REPEAT (Step 210), and so the action proceeds differently than for ONE-SHOT or REPEAT. The HOLD-REPEAT trigger type requires that the software application maintain knowledge of the current keystroke (the hold-repeat key) so that it may send a matching key-UP message to the target application when the STOP trigger is received, or whenever the hold-repeat key changes. When the initial START trigger is received, the value of the hold-repeat key is NONE. After determination of the HOLD-REPEAT trigger type in Step 210, the software application proceeds to compare the current keystroke ("d") with the hold-repeat key value (Step 220). Finding this value to be NONE, there is therefore nothing to send, and so the software application proceeds to synthesize and send the KEY-DOWN event for the keystroke "d" (Step 221). Now the hold-repeat key value is set to "d" (Step 222). Since the current sequence contains only one keystroke, the software application now falls out of the loop and proceeds to increment the current keystroke table index (Step 202). Since the table contains only one sequence, the table index position remains at "1". Now the action proceeds exactly as described in Example 4 for the REPEAT trigger type. The software application starts a timer which lapses after the delay interval (Step 40). The trigger is not yet stopped (Step 41), so the software application prepares to send the keystroke sequence again (Step 60). As before, it retrieves the keystroke sequence at table index position "1" (FIG. 3, Step 200). The keystroke sequence consists of the single keystroke event "d". When the action arrives at Step 220, the current keystroke and the hold-repeat key value are both "d". Since they are equal, there is nothing to send, and the software application proceeds to synthesize and send the next KEY-DOWN message, which is "d" (Step 221) to the target application. The hold-repeat key value is set to "d" (hence no change), the action falls out of the loop and once again resets the table index position (Step 202) to "1". We are now back on FIG. 3, having just completed Step 60. The software application starts a timer scheduled to lapse after the keystroke repeat rate interval (Step 61). As soon as it lapses, the software application once again checks to see if the STOP trigger has been received (Step 41).

Let us assume then, that the user has unblocked the beam, resulting in the software application receiving a STOP trigger as previously described. The test in Step 41 will now find that the STOPPED flag is, indeed, true, and therefore the Send-Keystroke-Sequence loop among Steps 60, 61 and 41 is broken and the action falls to Step 42. The trigger type is HOLD-REPEAT, so the hold-repeat key value (last set to "d") is used to synthesize and send a KEY-UP message to the target third-party application (Step 62). At this point the START/STOP trigger cycle is complete and there is nothing left to be done (Step 43).

A Note about Modifier Keys

In all of the preceding examples, we have demonstrated the use of keystroke sequences composed of lower-case characters. An upper-case character like "M" is actually a combination of two keystrokes, the <shift> key, followed by the "m" key (with the <shift> key held down). There are three such special keystrokes: <shift>, <control> and <alt>, which are called "modifier" keys. In fact, a "keystroke" is actually a compound event, composed of a numeric keycode indicating the exact physical key which is pressed, along with a set of flags indicating which of the modifier keys, if any, is pressed at the same moment. Thus, a HOLD-REPEAT sequence composed of the upper-case character "K" is actually comprised of this sequence of keystroke events:

| Event | KeyCode | Modifier |
|---|---|---|
| KEYDOWN | <shift> | (none) |
| KEYDOWN | k | shift |
| KEYDOWN | k | shift |
| KEYDOWN | k | shift |
| ... (continue as long as user holds trigger on) | | |
| KEYUP | k | shift |
| KEYUP | <shift> | (none) |

MIDI Functions

The Musical Instrument Digital Interface specification has been well-described elsewhere. The MIDI standard allows hardware and software from different vendors to exchange messages in a specific format and thus to operate in a cooperative manner. Modern operating systems provide means whereby a software application can appear as a virtual MIDI "source" (a MIDI output device) to other, third-party applications. The software application of the present invention does precisely this, which allows third-party applications to choose the present invention virtual MIDI port as an input source. Thus, the software application can send a MIDI message to its virtual output port, and this message will be received by any application that is "listening" to that port.

The CTI Inspector (Editor) described above in Example 2 can also be used to enter MIDI messages into the CTI, in much the same manner as has been described for keystroke sequences. In the case of MIDI messages, however, there is no counterpart to the HOLD-REPEAT trigger type. There is also one particular type of MIDI message, the Note-ON message, which is normally paired with a matching Note-OFF message (third-party applications may choose to ignore the Note-OFF). When the software application of the present invention sends a Note-ON message, it also places a matching Note-OFF message in a queue. The messages in this queue are sent at an appropriate time in the future.

There are several types of MIDI messages. One is the "continuous controller" message, of which there are 128 different subtypes. For example, subtype 10 (Pan) is normally used to control left-right position in a stereo field. Subtype 1 (Mod Wheel) is normally used to control modulation of a sound. Two other types of MIDI messages have already been described: the Note-ON and Note-OFF messages.

Example 6

Multiple One-Shot MIDI Sequences

Let us suppose that the MIDI command sequence "Pan-64, Mod-37, NoteOn-60", when received by a third-party DJ software application, performs two audio initialization functions and then starts sample number 60 playing. Let us suppose that playback of sample number 60 is stopped upon reception of a "NoteOff-60" message. Let us further suppose that a similar sequence "Pan-95, Mod-20, NoteOn-61", performs a similar series of actions with sample number 61, and that playback of sample number 61 is stopped upon reception of a "NoteOff-61" message.

Figure 11:
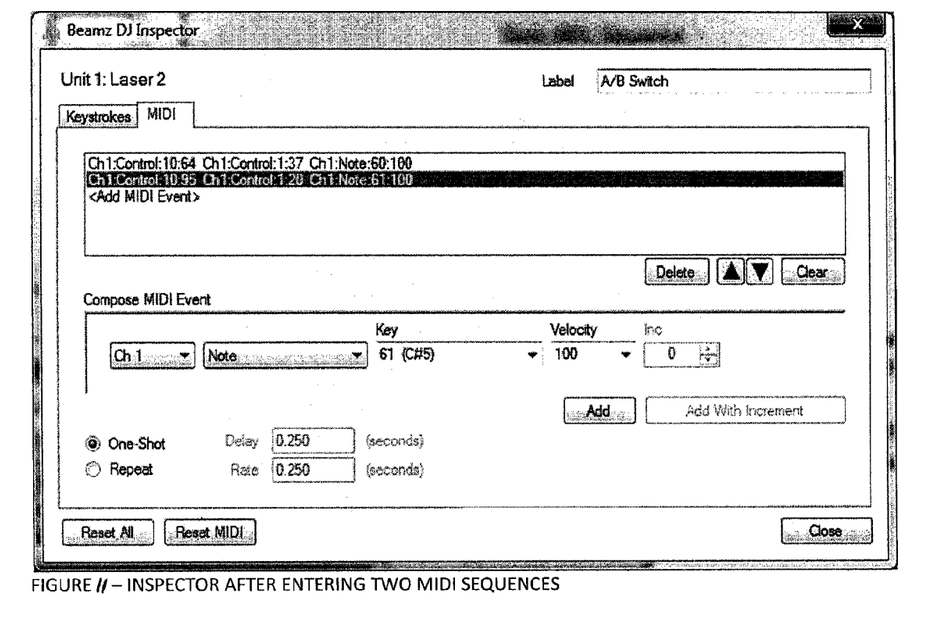
FIG. 11 depicts the Inspector Window depicting two different keystroke sequences associated with a trigger labeled Laser 2.

Now let us suppose that the user wishes to send these MIDI command sequences in alternating fashion to the third-party DJ application, by repeatedly blocking and unblocking Laser 2 on Unit 1 shown in FIG. 1. The user opens the Inspector for the second Laser and enters the MIDI commands just described (FIG. 11). The user saves these commands in the CTI by closing the Inspector window.

Figure 6:
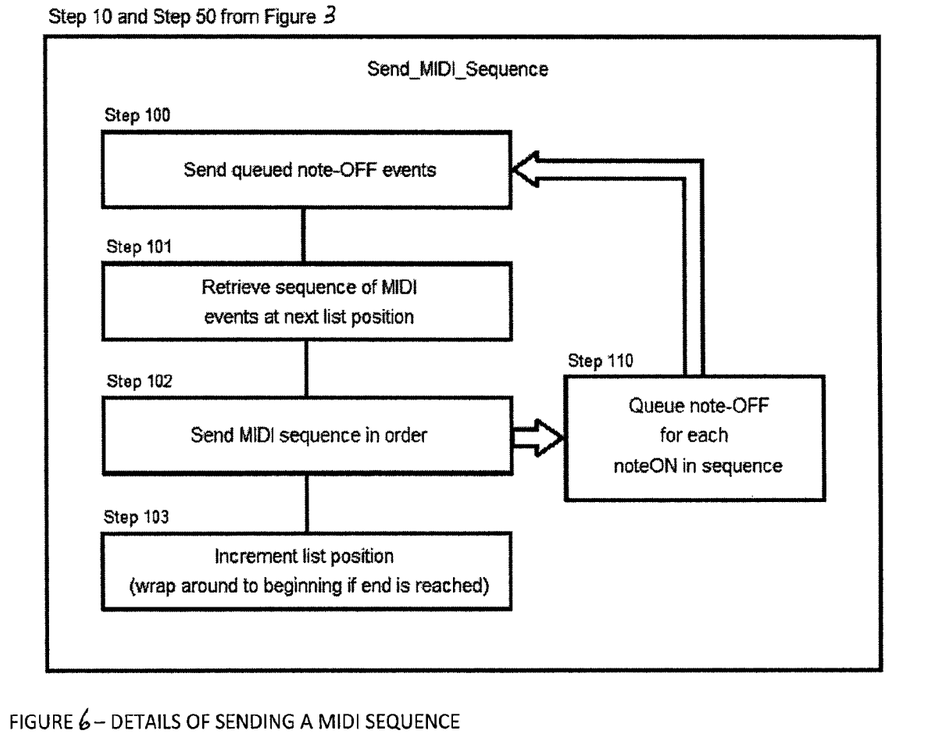
FIG. 6 depicts a flow diagram of an algorithm for processing a Send MIDI Sequence.

Now, when Laser 2 on Unit 1 is blocked, the software application receives a START trigger, and retrieves the CTI for Laser 2 (FIG. 3, Step 1). The software application sets the STOPPED flag to false (Step 2), and then looks to see if the MIDI sequence table contains any data (Step 3). In this case, it discovers two MIDI sequences, and so proceeds to send the first one (Step 10). The steps involved in sending the MIDI sequence are shown in detail in FIG. 6. First the Note-OFF queue is checked, but found to be empty (Step 100). Then, the sequence at MIDI table index position "1" is retrieved (Step 101). This sequence (Pan-64, Mod-37, NoteOn-60) is then sent to the virtual MIDI out port in order (Step 102). After the NoteON event is sent, a matching NoteOFF is placed into the NoteOFF queue for later retrieval (Step 110). The sequence has now been sent to the DJ player application, and the MIDI table index position is incremented to the value "2" (Step 103).

Step 10 (FIG. 3) is now complete, and the software application next checks the trigger type to see if it repeats (Step 11). In this case, the type is ONE-SHOT, so the software application proceeds to check the keystroke sequence table (Step 4). Finding it empty, the software application completes its response to the START trigger (Step 5).

Eventually, the user unblocks Laser 2, causing a STOP trigger to be sent to the software application (FIG. 4, Step 300). The global STOPPED flag for the CTI is set to TRUE (Step 301), and the MIDI sequence table is checked for data (Step 302). Since the table contains MIDI data, the software application checks the NoteOFF queue (Step 310), and sends the NoteOFF message placed there earlier (from Step 110) to the DJ player application. Thus, the target third-party DJ player application receives the message "NoteOFF-60". The queue is cleared after sending all messages contained therein. Completing the response to the STOP trigger, the software application checks the keystroke sequence table (Step 303), finds it empty, and is therefore finished (Step 304).

Now the user blocks Laser 2 again. This time the same series of actions occurs as before, except that this time the MIDI table index position contains the value "2" (FIG. 6, Step 101), and so the second MIDI command sequence (Pan-95, Mod-20, NoteOn-61) is retrieved and sent (Step 102) to the DJ player application. A NoteOff-61 message is placed into the Note-OFF queue, and the MIDI table index position is incremented to the value "3" (Step 103). Since the table contains only two sequences, this value is out of bounds and is immediately reset to "1", the beginning of the table.

Eventually the user unblocks Laser 2, causing a STOP trigger to be sent to the software application as before. Again, the Note-OFF queue is checked (FIG. 2, Step 310), which now contains the message NoteOff-61, which is immediately sent (Step 110). The remaining steps proceed as before, completing the START/STOP trigger cycle.

The third time the user blocks Laser 2, the first sequence will once again be sent, since the MIDI table index position now contains the value "1".

Example 7

Controlling a Video Game System

Many computer games use the four arrow keys on the keyboard to navigate through the game space, and use other mnemonic keystrokes to initiate common actions. For example, keystroke "p" might mean "pick it up", and keystroke "d" might mean "drop it". The <spacebar> is commonly used to mean "shoot" ("punch", "discharge", etc, depending on context).

Let us suppose that the user wishes to control a game with these keystroke commands using the software application. Let us further suppose that the user wishes to use the four laser beams of the controller shown in FIG. 1 as navigation controls, and the other buttons to perform specific tasks. The user opens the Inspector for Laser 1, and enters a single keystroke sequence consisting of the single keystroke <UpArrow>. The trigger type is set to HOLD-REPEAT. Similarly, the user assigns <DownArrow> to Laser 2, <LeftArrow> to Laser 3, and <RightArrow> to Laser 4. Next the user opens the Inspector for the large Center button and assigns a single keystroke sequence consisting of a single <SpaceBar> keystroke, with ONE-SHOT trigger type. Finally, the left and right Rocker switches can be assigned single keystroke sequences "p" and "d", again using the ONE-SHOT trigger type.

The four laser beams now assume the functionality of a joystick. The user blocks Laser 1 to move forward, Laser 2 to move backward, and Lasers 3 and 4 to move left and right, respectively. Like holding down a key, the user's movement within the game space continues in the chosen direction as long as the corresponding laser remains blocked.

The large center button on the Beamz hardware controller shown in FIG. 1 can now be used to shoot or punch, the left rocker switch can now be used to pick up an object encountered in the course of the game, and the right rocker switch can be used to discard an object.

Example 8

Lighting Control

Many live shows make use of specialized software and hardware to control complex lighting changes. A typical lighting control application allows the user to create "scenes" or "pages", essentially descriptions of the lighting instruments used in a particular scene, including their brightness and any fade-ins or fade-outs. Furthermore, lighting control software typically allows the user to create keystroke "macros", (user-defined sequences), which, when typed into the computer's keyboard, trigger the scene changes desired during the course of the entertainment.

Entertainers may add visual excitement to a performance by programming the software application to send the desired keystroke sequences to the third-party lighting control software. Let us suppose, for example, that an entertainer (a DJ) has pre-programmed four different lighting configurations in a venue, and has furthermore assigned the simple keystroke sequences "1", "2", "3" and "4", respectively, to trigger them. Let us further suppose that the entertainer wishes to use the four laser beams on the Beamz hardware to initiate these lighting changes. In the software application configured to control a game as described in Example 7, the user assigns these simple single-keystroke sequences to the four Laser controls, respectively, as ONE-SHOT triggers. From then on, the DJ need only wave a hand through the corresponding laser to initiate a lighting change to the desired lighting configuration.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A computer readable medium including instructions for controlling a multi-media application, comprising;
    instructions for receiving a control signal from a controller having at least one trigger;
    instructions for associating a software control with each said trigger; and
    instructions for each said software control such that a plurality of keystrokes and/or a plurality of MIDI commands are generated upon receipt of the control signal from the trigger for controlling the multi-media application.

2. The computer readable medium as specified in claim 1 wherein the instructions for each said software control is programmable such that a user can selectively associate the generated plurality of keystrokes and the plurality of MIDI commands with each said trigger.

3. The computer readable medium as specified in claim 1, further comprising instructions for generating a graphical user interface (GUI) having an icon associated with each said software control.

4. The computer readable medium as specified in claim 1, wherein the generated plurality of keystrokes and the plurality of MIDI commands are configured to control a disc jockey (DJ) player application as the multi-media application.

5. The computer readable medium as specified in claim 1, wherein the generated plurality of keystrokes and the plurality of MIDI commands are configured to control a video game player application as the multi-media application.

6. The computer readable medium as specified in claim 5 wherein the plurality of keystrokes are configured to control multiple attributes of a video game executed on the video game player application.

7. The computer readable medium as specified in claim 1, further comprising instructions for receiving control signals from a controller having a plurality of triggers, and instructions for associating a software control with each said trigger.

8. The computer readable medium as specified in claim 1 further comprising instructions such that the plurality of keystrokes and a plurality of MIDI commands are stored in a table.

9. The computer readable medium as specified in claim 1 further comprising instructions such that the plurality of keystrokes and the plurality of MIDI commands are displayed in a table by the GUI.

10. The computer readable medium as specified in claim 1, further comprising instructions for receiving a control signal from a trigger comprising an electromagnetic beam.

11. The computer readable medium as specified in claim 1, further comprising instructions for receiving a control signal from a trigger comprising a light beam, such that the plurality of keystrokes and the plurality of MIDI commands are generated when a user interrupts the light beam.

12. The computer readable medium as specified in claim 1, further comprising instructions for receiving a control signal from a trigger comprising a switch.

13. The computer readable medium as specified in claim 1, wherein the generated plurality of keystrokes and the plurality of MIDI commands are configured to control a lighting system.

14. The computer readable medium as specified in claim 1, wherein the generated plurality of keystrokes and the plurality of MIDI commands are configured to control an music system.

15. The computer readable medium as specified in claim 1, wherein the generated plurality of keystrokes and the plurality of MIDI commands are configured to control an entertainment system.

* * * * *